United States Patent
Roddy

(10) Patent No.: US 9,872,580 B1
(45) Date of Patent: Jan. 23, 2018

(54) CURTAIN ROD AND WINDOW BLIND HOLDER

(71) Applicant: Kelvin Roddy, Westborough, MA (US)

(72) Inventor: Kelvin Roddy, Westborough, MA (US)

( * ) Notice: Subject to any disclaimer, the term of this patent is extended or adjusted under 35 U.S.C. 154(b) by 0 days.

(21) Appl. No.: 15/396,933

(22) Filed: Jan. 3, 2017

(51) Int. Cl.
| | |
|---|---|
| A47H 1/10 | (2006.01) |
| A47H 1/102 | (2006.01) |
| A47H 1/02 | (2006.01) |
| F16M 13/02 | (2006.01) |
| F16B 2/22 | (2006.01) |
| F16B 45/00 | (2006.01) |

(52) U.S. Cl.
CPC ............. *A47H 1/102* (2013.01); *A47H 1/02* (2013.01); *F16B 2/22* (2013.01); *F16B 45/00* (2013.01); *F16M 13/022* (2013.01)

(58) Field of Classification Search
USPC ....... 248/251, 252, 253, 261, 262, 263, 265, 248/266, 267, 269, 215; 211/180, 105.1, 211/123, 124
See application file for complete search history.

(56) References Cited

U.S. PATENT DOCUMENTS

| | | | | |
|---|---|---|---|---|
| 691,799 | A * | 1/1902 | Obenchain | E06B 9/54 160/23.1 |
| 1,042,697 | A * | 10/1912 | Leiby | A47H 1/13 248/252 |
| 1,786,038 | A * | 12/1930 | Swanson | A47B 97/02 248/307 |
| 1,856,847 | A * | 5/1932 | Gates | A47G 29/083 211/106.01 |
| 2,374,165 | A | 4/1945 | Barbee | |
| 2,508,737 | A * | 5/1950 | Zeto | E06B 9/323 248/263 |
| 4,397,438 | A | 8/1983 | Chapman | |
| D290,931 | S | 7/1987 | Powell | |
| 5,014,948 | A * | 5/1991 | Asaro | A47B 96/16 211/104 |
| 5,398,900 | A * | 3/1995 | Schober | A47H 1/142 248/206.5 |
| 5,520,235 | A * | 5/1996 | Coleman | A47H 1/06 160/126 |
| 5,979,848 | A * | 11/1999 | Kuthy | A47H 1/10 160/902 |
| 6,601,809 | B1 | 8/2003 | Gebrara | |

(Continued)

FOREIGN PATENT DOCUMENTS

WO    8808684 A1    11/1988

*Primary Examiner* — Terrell L McKinnon
*Assistant Examiner* — Michael McDuffie
(74) *Attorney, Agent, or Firm* — Kyle A. Fletcher, Esq.

(57) ABSTRACT

The curtain rod and window blind holder is configured for use with a curtain rod. The curtain rod and window blind holder is further configured for use with the headrail of blinds that are installed in a window frame. The curtain rod and window blind holder is installed in a window frame by attaching directly to the headrail of the blinds. This attachment eliminated the need to damage a drywall surface or a window frame in order to install curtains in a window frame. The curtain rod and window blind holder comprises a master clip, a first rod hook, and a second rod hook. The master clip attaches to the headrail. The first rod hook and the second rod hook are attached to the master clip.

18 Claims, 5 Drawing Sheets

(56) References Cited

U.S. PATENT DOCUMENTS

| | | | | |
|---|---|---|---|---|
| 6,655,538 | B2 * | 12/2003 | Saulnier-Matteini | A47B 45/00 211/105.1 |
| 6,840,482 | B2 * | 1/2005 | Downey | A47H 1/14 248/262 |
| 7,198,088 | B2 | 4/2007 | McMenamin | |
| 8,056,873 | B1 | 11/2011 | Hanley | |
| 8,418,975 | B1 * | 4/2013 | Burr | A47H 1/142 248/261 |
| 9,004,429 | B2 * | 4/2015 | Dennison | A47H 1/04 16/94 D |
| 9,273,803 | B2 * | 3/2016 | Adams | F16L 3/127 |
| 2003/0066938 | A1 * | 4/2003 | Zimmerman | F21V 21/088 248/301 |
| 2008/0023605 | A1 * | 1/2008 | Yang | A47B 97/02 248/261 |
| 2014/0299282 | A1 | 10/2014 | Fritz | |

\* cited by examiner

CURTAIN ROD AND WINDOW BLIND HOLDER

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal or domestic articles including furnishings for windows or doors, more specifically, a curtain suspension device.

SUMMARY OF INVENTION

The curtain rod and window blind holder is configured for use with a curtain rod. The curtain rod and window blind holder is further configured for use with the headrail of blinds that are installed in a window frame. The curtain rod and window blind holder is installed in a window frame by attaching directly to the headrail of the blinds. This attachment eliminated the need to damage a drywall surface or a window frame in order to install curtains in a window frame. The curtain rod and window blind holder comprises a master clip, a first rod hook, and a second rod hook. The master clip attaches to the headrail. The first rod hook and the second rod hook are attached to the master clip.

These together with additional objects, features and advantages of the curtain rod and window blind holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the curtain rod and window blind holder in detail, it is to be understood that the curtain rod and window blind holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the curtain rod and window blind holder.

It is therefore important that the claims be regarded as including such equivalent construction insofar as they do not depart from the spirit and scope of the curtain rod and window blind holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
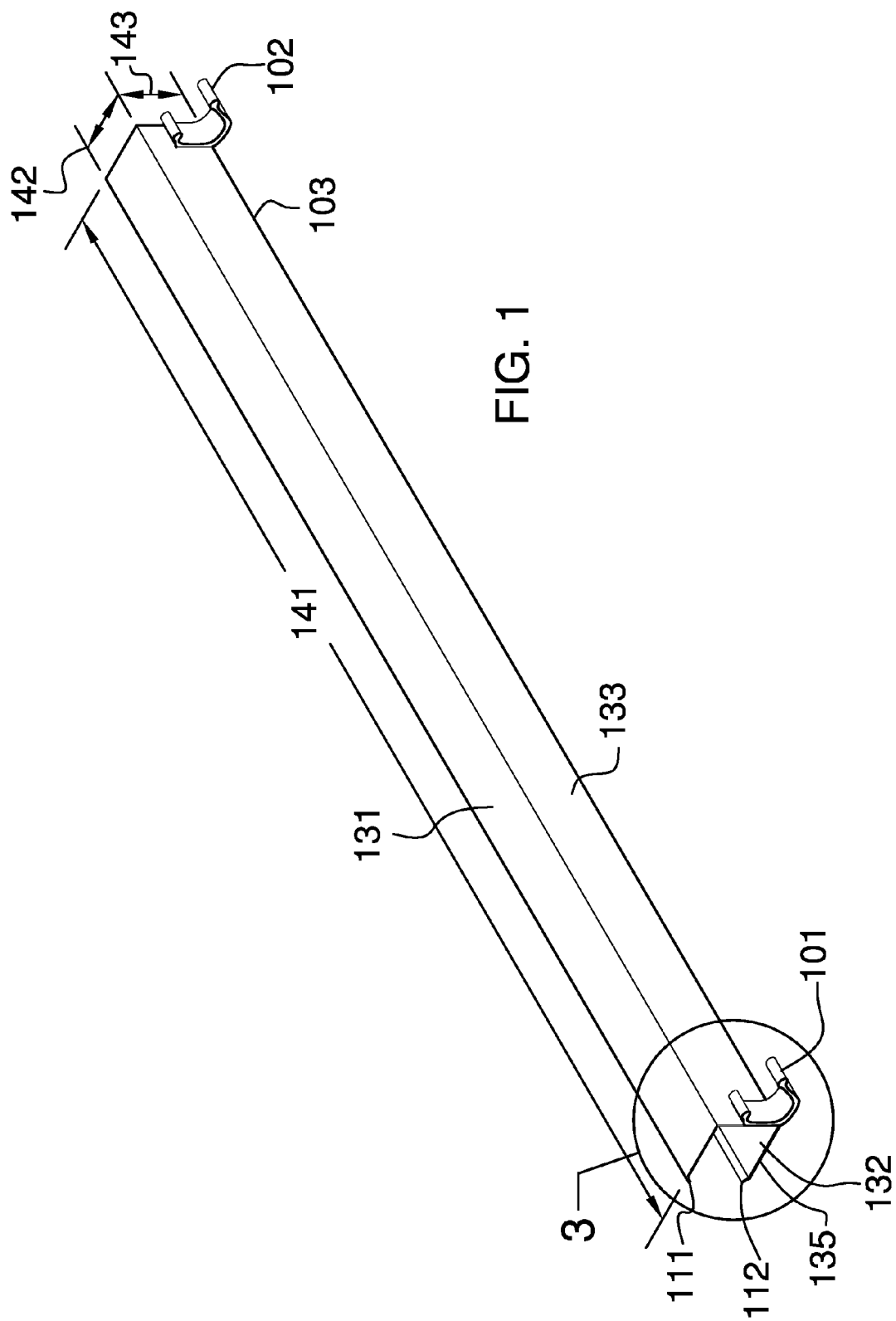
FIG. 1 is a perspective view of an embodiment of the disclosure.
Figure 2:
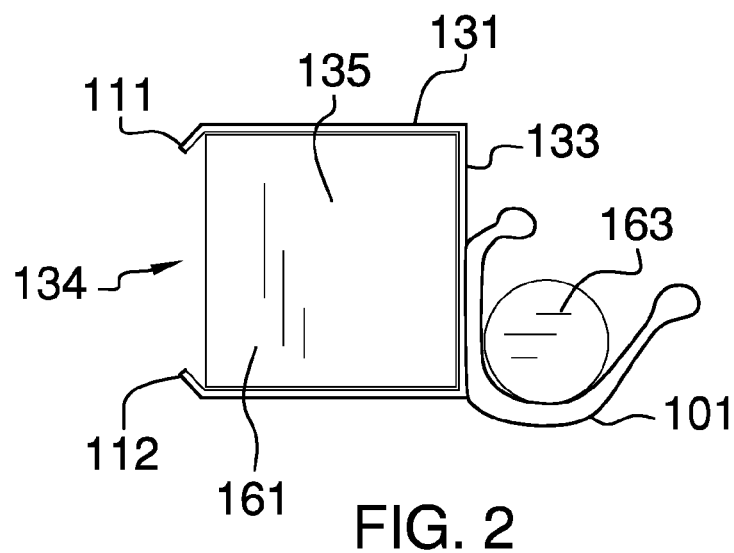
FIG. 2 is a side view of an embodiment of the disclosure.
Figure 3:
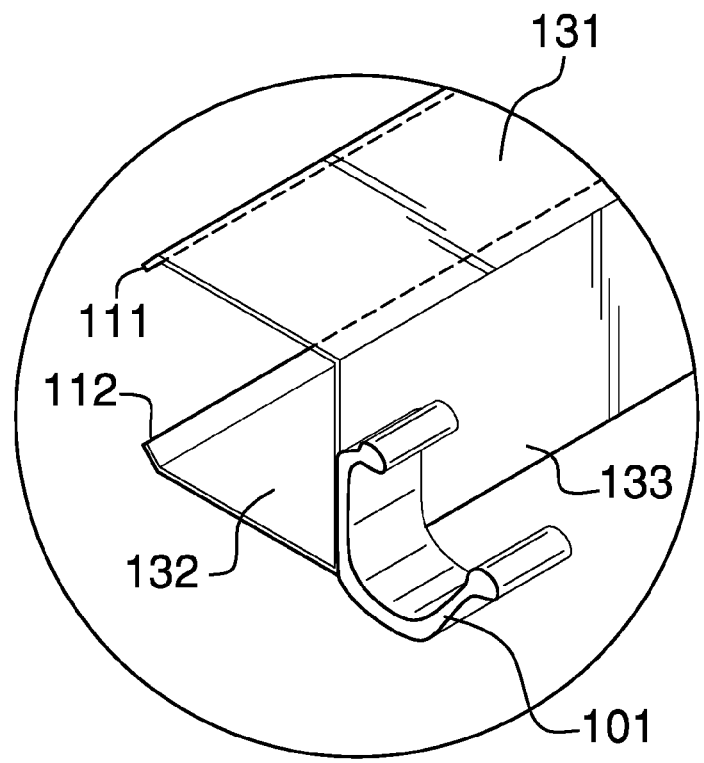
FIG. 3 is a rear view of an embodiment of the disclosure.
Figure 4:
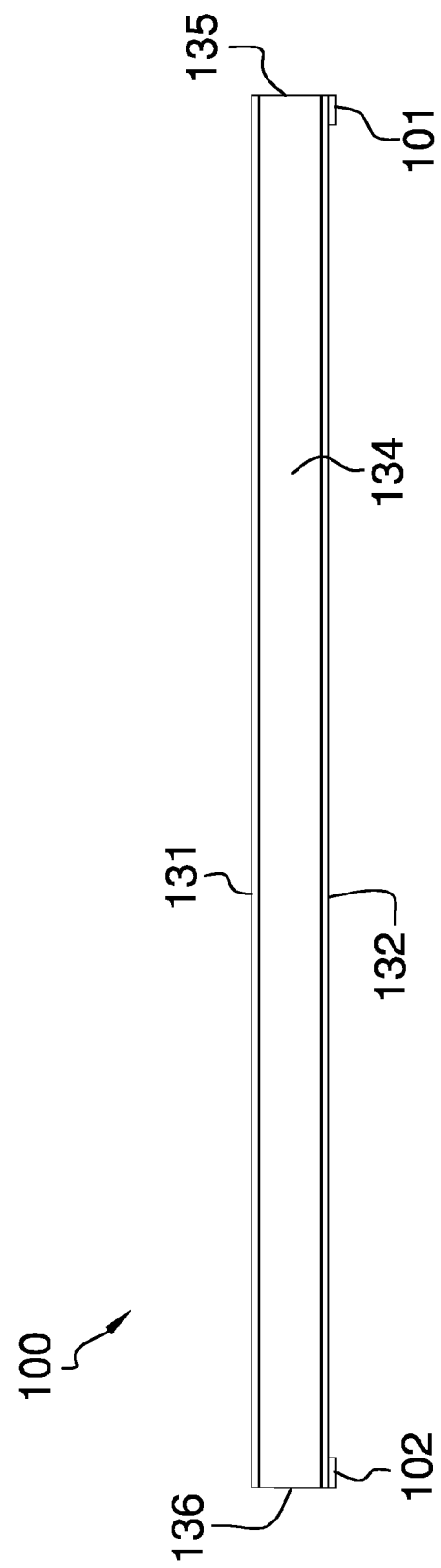
FIG. 4 is an in use view of an embodiment of the disclosure.
Figure 5:
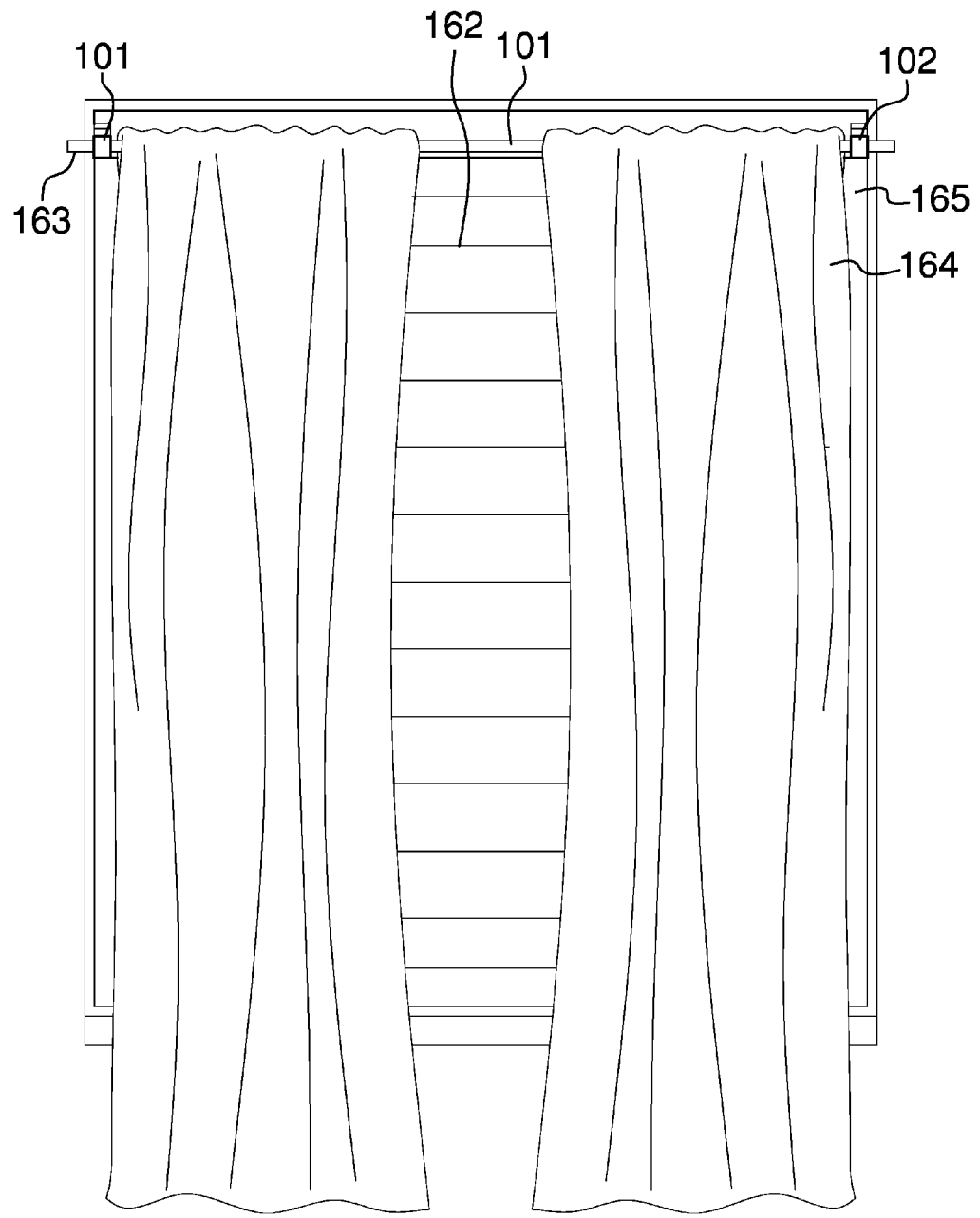
FIG. 5 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The curtain rod and window blind holder 100 (hereinafter invention) is configured for use with a curtain rod 163. The invention 100 is further configured for use with the headrail 161 of blinds 162 that are installed in a window frame 165. The window frame 165 is a framed structure that is built within an exterior wall of a building that is used to contain a transparent structure commonly referred to as a window. The blind 162 is a readily and commercially available window dressing that is used to prevent light from passing through a window or a window frame 165. The headrail 161 is a mechanical apparatus that is used to open and close a blind 162 for a window frame 165. The typical headrail 161 is encased in a rectangular block shaped housing. The headrail 161 is further defined with an outer dimension. The invention 100 is installed in a window frame 165 by attaching directly to the headrail 161 of the blinds 162. This attachment method eliminates the need to damage a drywall surface or a window frame 165 in order to install curtains 164 in a window frame 165. The invention 100 comprises a master clip 103, a first rod hook 101, and a second rod hook 102. The master clip 103 attaches to the headrail 161. The first rod hook 101 and the second rod hook 102 are attached to the master clip 103. The first rod hook 101 and the second rod hook 102 are used to support a curtain rod 163. The curtain rod 163 is a cylindrical shaft from which a curtain 164 is hung. The curtain rod 163 is further defined with an outer dimension. The curtain 164 is a readily and commercially available window dressing that is used to prevent light from passing through a window or a window frame 165.

The master clip 103 is a hollow rectilinear structure that attaches directly to the headrail 161 of a blind 162. The master clip 103 is a spring structure that fits around the headrail 161 such that the master clip 103 clamps to the headrail 161 when the master clip 103 is in its relaxed shape. The master clip 103 presents the first rod hook 101 and the second rod hook 102 along the front face 133 such that the curtain rod 163 is supported via the first rod hook 101 and the second rod hook 102.

The master clip 103 is further defined with a top face 131, a bottom face 132, a front face 133, a rear face 134, a left edge 135, and a right edge 136. The master clip 103 is further defined with a width direction 141, a depth direction 142, and a height direction 143. The master clip 103 is further defined with an inner dimension. The inner dimension of the master clip 103 is greater than the outer dimension of the headrail 161 such that the headrail 161 will fit within the master clip 103.

The master clip 103 further comprises a top flare 111 and a bottom flare 112. The top flare 111 attaches to the top face 131 of the master clip 103 proximal to the rear face 134. The top flare 111 is an angled surface that projects away from the free end of the top face 131. As shown most clearly in FIG. 6, the free end of the top flare 111 is positioned to form a downward angle towards the bottom face 132 of the master clip 103. The bottom flare 112 attaches to the bottom face 132 of the master clip 103 proximal to the rear face 134. The bottom flare 112 is an angled surface that projects away from the free end of the bottom face 132. As shown most clearly in FIG. 6, the free end of the bottom flare 112 is positioned to form an upward angle towards the top face 131 of the master clip 103.

The headrail 161 is inserted into the master clip 103 through the open rear face 134 of the master clip 103.

The top face 131 is the highest vertical face of the master clip 103 when the invention 100 is installed normally. The top face 131 is attached to the front face 133 in the manner of a cantilever. The top face 131 projects perpendicularly away from the front face 133. The top face 131 acts as a spring. Specifically, when a force is applied perpendicularly to the surface of the top face 131, the elasticity of the top face 131 creates a rotational torque that opposes the displacement created by rotating the top face 131 around a pivot point located where the top face 131 is attached to the front face 133. This rotational torque places a strain on the top face 131 such that the force of the strain is in the direction that returns the top face 131 to its original position. When the headrail 161 is inserted between the top face 131 and the bottom face 132, this spring like action produces a clamping force that holds the invention 100 securely in position against the headrail 161.

The bottom face 132 is the lowest vertical face of the master clip 103 when the invention 100 is installed normally. The bottom face 132 is attached to the front face 133 in the manner of a cantilever. The bottom face 132 projects perpendicularly away from the front face 133. The bottom face 132 acts as a spring. Specifically, when a force is applied perpendicularly to the surface of the bottom face 132, the elasticity of the bottom face 132 creates a rotational torque that opposes the displacement created by rotating the bottom face 132 around a pivot point located where the bottom face 132 is attached to the front face 133. This rotational torque places a strain on the bottom face 132 such that the force of the strain is in the direction that returns the bottom face 132 to its original position. When the headrail 161 is inserted between the bottom face 132 and the top face 131, this spring like action produces a clamping force that holds the invention 100 securely in position against the headrail 161.

The front face 133 is the face of the master clip 103 that attaches the top face 131 to the bottom face 132.

The rear face 134 is the open face of the master clip 103 that is distal from the front face 133. The headrail 161 is inserted into the master clip 103 through the open rear face 134 of the master clip 103.

The left edge 135 is an open face of the master clip 103 that forms a boundary of the master clip 103 along the width direction 141. The right edge 136 is an open face of the master clip 103 that forms a boundary of the master clip 103 along the width direction 141. The right edge 136 is the face of the master clip 103 that is distal from the left edge 135. When the front face 133 is viewed directly, the right edge 136 is the face of the master clip 103 that is to the viewer's right.

The width direction 141 is the horizontal direction of the master clip 103 that runs parallel to the direction of the front face 133. The depth direction 142 is the horizontal direction of the master clip 103 that is: 1) perpendicular to the width direction 141; and 2) is perpendicular to the height direction 143. The height direction 143 is the direction of the master clip 103 that runs parallel to the vertical direction.

Figure 6:
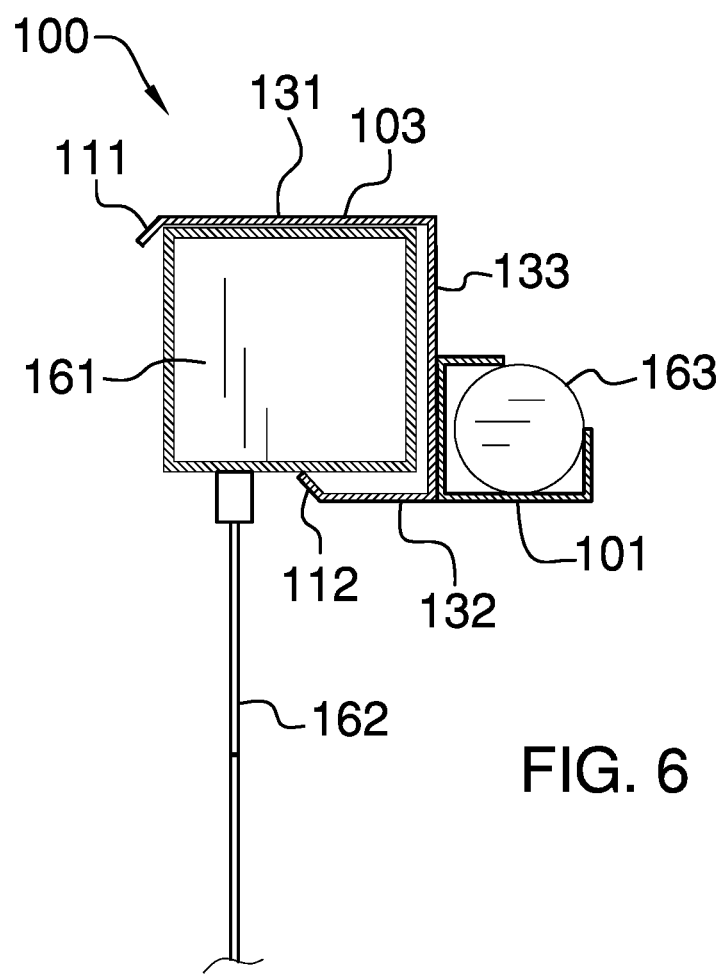
FIG. 6 is a detail side view of an embodiment of the disclosure.

In the first potential embodiment of the disclosure, as shown most clearly in FIG. 6, the span of the depth direction 142 of the top face 131 is greater than the span of the depth direction 142 of the bottom face 132 such that the a clearance is provided for the operation of the blind 162.

The first rod hook 101 is a loop like structure that curves back on itself. The first rod hook 101 forms an interior space within which the curtain rod 163 is placed such that the first rod hook 101 will support the curtain rod 163. The first rod hook 101 attaches to the front face 133 of the master clip 103 in a location proximal to the left edge 135. The first rod hook 101 is further defined with an inner dimension. As shown most clearly in FIG. 6, the outer dimension of the curtain rod 163 is lesser than the inner dimension of the first rod hook 101 such that the curtain rod 163 can be inserted into the first rod hook 101.

The second rod hook 102 is a loop like structure that curves back on itself. The second rod hook 102 forms an interior space within which the curtain rod 163 is placed such that the second rod hook 102 will support the curtain rod 163. The second rod hook 102 attaches to the front face 133 of the master clip 103 in a location proximal to the right edge 136. The second rod hook 102 is further defined with an inner dimension. As shown most clearly in FIG. 6, the outer dimension of the curtain rod 163 is lesser than the inner dimension of the second rod hook 102 such that the curtain rod 163 can be inserted into the second rod hook 102.

The following definitions were used in this disclosure:

Cantilever: As used in this disclosure, a cantilever is a beam or other structure that projects away from an object and is supported on only one end.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inner Dimension: As used in this disclosure, the term inner dimension describes the span from a first inside or interior surface of a container to a second inside or interior surface of a container. The term is used in much the same way that a plumber would refer to the inner diameter of a pipe.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Relaxed Shape: As used in this disclosure, a structure is considered to be in its relaxed state when no shear, strain, or torsional forces are being applied to the structure.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A curtain suspension device comprising:
   a master clip, a first rod hook, and a second rod hook;
   wherein the curtain suspension device is configured for use with a curtain rod;
   wherein the curtain suspension device is further configured for use with the headrail of blinds that are installed in a window frame;
   wherein the headrail is further defined with an outer dimension;
   wherein the curtain suspension device is installed in a window frame by attaching directly to the headrail of the blinds;
   wherein the first rod hook and the second rod hook are attached to the master clip;
   wherein the first rod hook and the second rod hook are used to support a curtain rod;
   wherein the curtain rod is a cylindrical shaft from which a curtain is hung;
   wherein the curtain rod is further defined with an outer dimension;
   wherein the master clip is a hollow rectilinear structure;
   wherein the master clip is a spring structure that fits around the headrail such that the master clip clamps to the headrail;
   wherein the master clip is further defined with a top face, a bottom face, a front face, a rear face, a left edge, and a right edge;
   wherein the master clip is further defined with a width direction, a depth direction, and a height direction;
   wherein the master clip is further defined with an inner dimension;
   wherein the inner dimension of the master clip is greater than the outer dimension of the headrail such that the headrail will fit within the master clip.

2. The curtain suspension device according to claim 1 wherein the master clip presents the first rod hook and the second rod hook along the front face such that the curtain rod is supported by the first rod hook and the second rod hook.

3. The curtain suspension device according to claim 2
   wherein the master clip further comprises a top flare and a bottom flare;
   wherein the top flare attaches to the top face of the master clip;
   wherein the bottom flare attaches to the bottom face of the master clip;
   wherein the top flare is an angled surface that projects away from the free end of the top face;
   wherein the bottom flare is an angled surface that projects away from the free end of the bottom face.

4. The curtain suspension device according to claim 3
   wherein the free end of the top flare is positioned to form a downward angle towards the bottom face of the master clip;
   wherein the free end of the bottom flare is positioned to form an upward angle towards the top face of the master clip.

5. The curtain suspension device according to claim 4 wherein the headrail is inserted into the master clip through the rear face of the master clip.

6. The curtain suspension device according to claim 5 wherein the top face is attached to the front face in the manner of a cantilever.

7. The curtain suspension device according to claim 6
   wherein the top face projects perpendicularly away from the front face;
   wherein the top face is a spring.

8. The curtain suspension device according to claim 7 wherein when a force is applied perpendicularly to the surface of the top face the elasticity of the top face creates a rotational torque that opposes the displacement created by rotating the top face around a pivot point located where the top face is attached to the front face.

9. The curtain suspension device according to claim 8 wherein the bottom face is attached to the front face in the manner of a cantilever.

10. The curtain suspension device according to claim 9
    wherein the bottom face projects perpendicularly away from the front face;
    wherein the bottom face is a spring.

11. The curtain suspension device according to claim 10 wherein when a force is applied perpendicularly to the surface of the bottom face the elasticity of the bottom face creates a rotational torque that opposes the displacement created by rotating the bottom face around a pivot point located where the bottom face is attached to the front face.

12. The curtain suspension device according to claim 11 wherein when the headrail is inserted between the top face and the bottom face a clamping force holds the curtain suspension device securely in position against the headrail.

13. The curtain suspension device according to claim 12 wherein the front face is the face of the master clip that attaches the top face to the bottom face.

14. The curtain suspension device according to claim 13 wherein the rear face is the open face that is distal from the front face.

15. The curtain suspension device according to claim 14 wherein the span of the depth direction of the top face is greater than the span of the depth direction of the bottom face.

16. The curtain suspension device according to claim 15
 wherein the first rod hook is a loop like structure that curves back on itself;
 wherein the second rod hook is a loop like structure that curves back on itself.

17. The curtain suspension device according to claim 16 wherein the first rod hook forms an interior space;
 wherein the second rod hook forms an interior space;
 wherein the first rod hook is further defined with an inner dimension;
 wherein the outer dimension of the curtain rod is lesser than the inner dimension of the first rod hook such that the curtain rod can be inserted into the first rod hook;
 wherein the second rod hook is further defined with an inner dimension;
 wherein the outer dimension of the curtain rod is lesser than the inner dimension of the second rod hook such that the curtain rod can be inserted into the second rod hook.

18. The curtain suspension device according to claim 17
 wherein the first rod hook attaches to the front face of the master clip in a location proximal to the left edge;
 wherein the second rod hook attaches to the front face of the master clip in a location proximal to the right edge.

* * * * *